United States Patent [19]

Zeuthen

[11] 3,997,261

[45] Dec. 14, 1976

[54] ELECTROPHOTOGRAPHIC COPYING APPARATUS

[75] Inventor: Karl Gustav Zeuthen, Gentofte, Denmark

[73] Assignee: Zeuthen & Aagaard A/S, Glostrup, Denmark

[22] Filed: Oct. 7, 1975

[21] Appl. No.: 620,254

[30] Foreign Application Priority Data

| | | |
|---|---|---|
| Oct. 15, 1974 | Denmark | 5397/74 |
| Jan. 14, 1975 | Germany | 2501236 |

[52] U.S. Cl. .................................... 355/8; 355/50; 355/84

[51] Int. Cl.[2] ................. G03G 15/28; G03B 27/50; G03B 27/10

[58] Field of Search ............... 355/8, 50, 51, 75, 84

[56] References Cited

UNITED STATES PATENTS

| | | | |
|---|---|---|---|
| 3,597,074 | 8/1971 | Murgas et al. | 355/75 X |
| 3,737,223 | 6/1973 | Yamamoto | 355/75 X |
| 3,740,133 | 6/1973 | Komori et al. | 355/84 X |
| 3,790,272 | 2/1974 | Knechtelet al. | 355/8 X |
| 3,907,422 | 9/1975 | Eppe et al. | 355/8 |

*Primary Examiner*—George H. Miller, Jr.
*Attorney, Agent, or Firm*—Stevens, Davis, Miller & Mosher

[57] ABSTRACT

An electrophotographic copying apparatus with an original support table arranged on the top of the housing to carry out a reciprocating linear movement out of and back to a home position whereby a copy sheet moved in synchronism with the table is exposed line by line to the original. Transmission means for transforming the rotary motion of a drive motor into linear reciprocating movement of the table includes an elongated tooth rim with internal teeth arranged vertically on a carriage extending along one side of the table and a pinion engaging the teeth of said tooth rim and being secured at one end of a transverse drive shaft, the other end of which is engaged with a transmission chain coupled with the motor and being journalled to allow vertical shifting of the pinion to engage one or the other of parallel horizontal rims of the tooth rim, a guide wheel being secured on the first end of the drive shaft to engage an endless guide track formed inside the tooth rim in parallel relationship to the teeth rims thereof. The vertical shift movement of the drive shaft may be utilized for operating an electric switch to connect and disconnect current supply to an exposure lamp.

5 Claims, 5 Drawing Figures

ELECTROPHOTOGRAPHIC COPYING APPARATUS

The present invention relates to an electrophotographic copying apparatus of the kind in which an original to be copied is supported on a movable table arranged on the top of the housing of the apparatus, which table is at least partially transparent, any by the movement of which out of and back to a home position, a photo-sensitive copy sheet is exposed line by line to the original by means of an optical system, the movement of the table being carried out by means of transmission members transforming the rotary motion of a drive motor into linear reciprocating movement of the table.

As used herein, the expression "table" should be understood so as to comprise the entire movable top portion of the apparatus incorporating a table plate made, for example, of glass or plastics, as well as a support such as a carriage or the like moving on balls, rollers, wheels or rails.

Compared with copying machines of the kind in which the original itself is carried through the machine by a system of conveying rollers, copying machines of the kind in which the original is positioned on a support plate which may be stationary or movable have the advantages that copies may easily be taken from book pages, and that such machines may without difficulties be constructed for automatical reproduction of several copies of the same original without any need of manual handling of the original for each copy to be made.

In prior art copying machines operating with a movable table, the reciprocating linear movement of the table has been carried out by means of transmission members in the form of a rather complicated wire driving mechanism which may be rather sensitive to disturbances and, moreover, makes servicing and repair of the machine more difficult and expensive. When the table after having moved through the first part of its movement from the home position, during which exposure is carried out, is to be returned to the home position, either a conversion of the current supply to the drive motor, or a complicated mechanical change-over operation will be necessary. By the inversion of the direction of movement, the table will be subjected to considerable deceleration and acceleration forces, as a result of which the reproduction will be inaccurate at the ends of the original. This disadvantage may be remedied in that the movement of the table is made longer than necessary when considering the magnitude of the original. However, thereby the dimensions of the machine are increased, which will be contradictory to the normal desire that electrophotographic copying machines for office use shall put as small demands on space as possible.

It is the object of the invention to provide an electrophotographic copying apparatus wherein these disadvantages are not present and where, in particular, an increased accuracy of reproduction is obtained in the edge regions without the need of increasing the practical minimum dimensions which will depend on the magnitude at the biggest original to be copied.

According to the invention, an electrophotographic copying machine is provided, comprising a housing, a partially transparent table for supporting an original to be copied and arranged for reciprocating linear movement on the top of said housing out of and back to a home position, an illumination station including a light source arranged in said housing below said table for exposure of a photosensitive copy sheet by said original line by line during said reciprocating movement, a drive motor arranged in said housing, and transmission means for transforming the rotary motion of said motor into said reciprocating movement of the table, said transmission means including a tooth rim connected with said table and having a number of teeth arranged internally along an endless path comprising two parallel rectilinear runs of a length corresponding to the stroke of said table and curved runs interconnecting said linear runs at either end thereof, a drive shaft coupled to said motor, a pinion of a diameter less than the distance between said parallel teeth runs and engaging the teeth of said tooth rim and being secured on said drive shaft, means for journalling said drive shaft relative to said housing so as to allow vertical shifting of said pinion from one to the other of said rectilinear teeth runs, a guide wheel mounted rotatably on the drive shaft outside said pinion, and an endless guide groove formed inside said tooth rim in parallel relationship with said endless teeth path to form a track for said guide wheel.

Thereby, the above mentioned disadvantages are remedied, and the manufacture as well as servicing of the apparatus are made less complicated.

In a preferred embodiment, the table is connected along one longitudinal side thereof with a carriage, on which said tooth rim is mounted to extend in a vertical plane, and the drive shaft extends transversely through the housing from said carriage to the opposite side of the table, at which a spherical bearing is mounted on the housing for journalling the drive shaft in a manner to allow pivotal movement of a shaft in a vertical plane. Thereby, the position of the part of the drive shaft coupled with the drive motor may remain substantially unchanged when the pinion is shifted from one to the other of the parallel runs of the tooth rim, so that an advantageous compromise may be obtained between the desire of the simplest and cheapest possible transmission between the drive motor and the carriage, and the necessary movability of the pinion. Moreover, in this embodiment, an advantageous separation of the transmitting members coupled with the drive motor and those coupled with the carriage may be obtained by arranging the drive motor on the opposite side of the housing relative to the carriage and securing a sprocket wheel on the end of the drive shaft remote from the carriage outside the spherical bearing to engage a drive chain coupled with the motor, said sprocket wheel being positioned in relation to the spherical bearing so as to include in its symmetry plane normal to the access of revolution the pivot centre for the drive shaft. Thereby, the position of the centre of the sprocket wheel will remain unchanged when the drive shaft is pivoted as a result of the shifting of the pinion.

In copying machines of the kind referred to having a movable table, it is known to use an electrical switch for supplying current to the light source, the operating member of which is engageable by an actuating member to connect and disconnect said current supply in response to the movement of the table.

According to a further aspect of the invention, the actuating member in such an arrangement may be constituted by a pivot arm journalled on a stationary pivot pin and being connected in one end with said drive shaft near said pinion, the other end of the pivot arm being positioned to engage said operating member to actuate the switch by the pivotal movement of the drive shaft, so that current is supplied to the light source only when the pinion engages the teeth of one of the parallel runs of the tooth rim.

Furthermore, it is possible according to the invention to reduce the dimension of the housing in the directional movement of the table to a length corresponding substantially to the length of the original support table by such an arrangement that the pinion engages in the home position of the table the teeth of a portion of one of the parallel runs having a location relative to the curved runs of the tooth rim corresponding to the location of the transverse drive shaft relative to the ends of the housing, whereas the pivot arm is disengaged from the operating member of the above mentioned electrical switch in this position of the pinion. Thereby, an advantageous timing of the exposure within the duration of the reciprocating movement of the table will be obtained.

In the following, the invention will be explained in more detail with reference to the accompanying drawings, on which FIG. 1 is a perspective outside view of an embodiment of a copying apparatus according to the invention;

Figure 1:
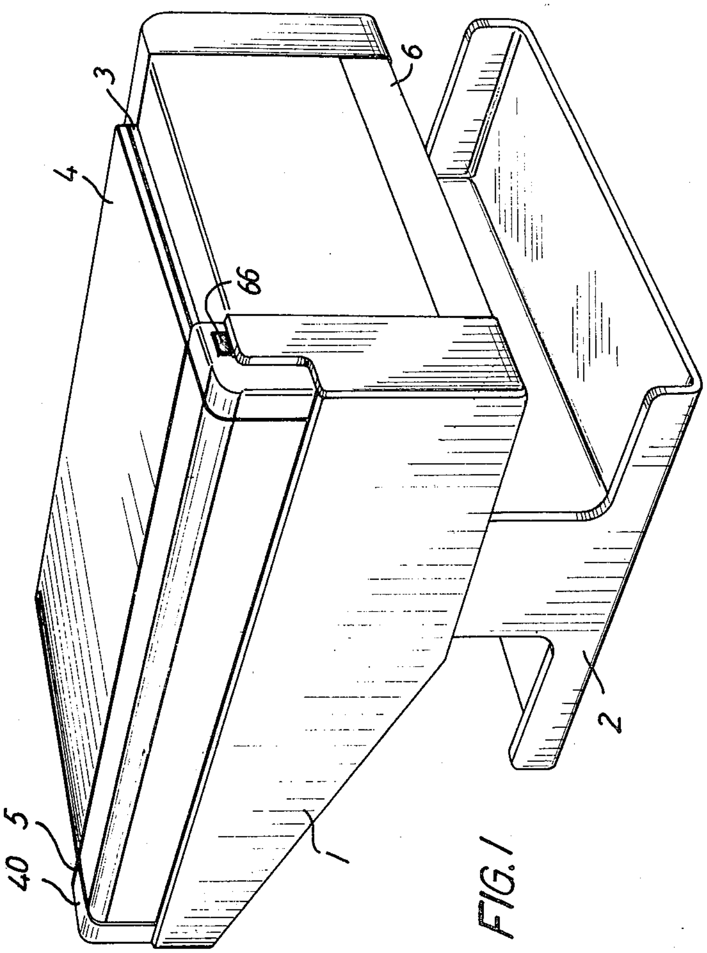

In the drawings, the copying apparatus shown in the perspective view in FIG. 1 is a table-size machine having an elongate, substantially box-shaped housing 1 and a transverse support leg 2 of an inverted T-shaped cross-section. An original to be copied is positioned on a transparent table plate 3 made, for example, of glass and is held by a cover plate 4 of an elastic material.

The exposure of a copy sheet is carried out by moving the table plate 3 with the original positioned thereon past a stationary optical system in the housing and, to this end, the table plate 3 is connected with a carriage 5 extending along one upper longitudinal side of the housing 1, said carriage being caused by driving means in the housing to carry out a linear reciprocating movement in the longitudinal direction of the housing through a stroke, such that the original is scanned throughout its length line by line by the optical system.

In FIG. 1, reference numeral 6 designates an outlet slit in one end wall of the housing 1, through which the exposed copy sheet subsequent to development and drying is discharged from the apparatus, for example, to a collecting tray not shown in the drawings.

Figure 2:
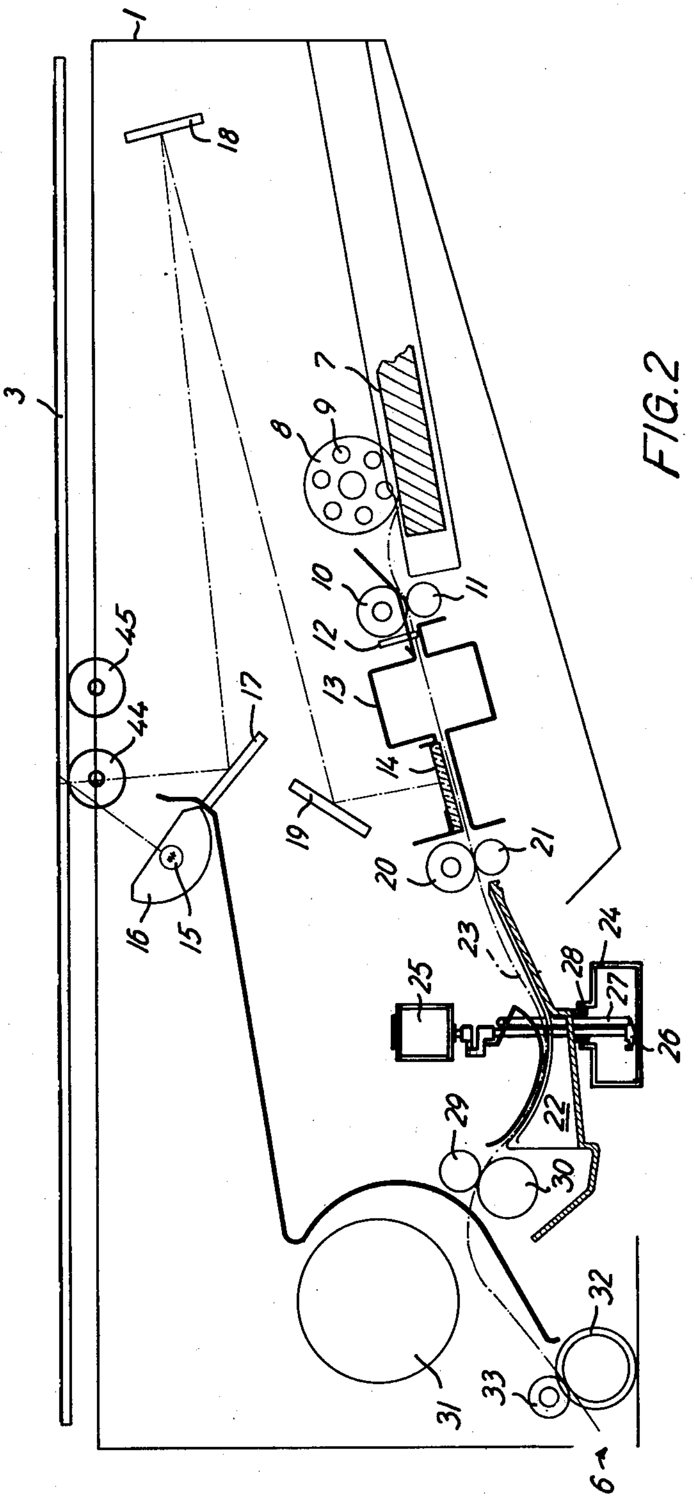
FIG. 2 shows the arrangement of the optical system and the processing stations for a copy sheet in the copying machine shown in FIG. 1.

FIG. 2 illustrates schematically the arrangement of the optical system and the processing station for the copy sheets.

Figure 3:
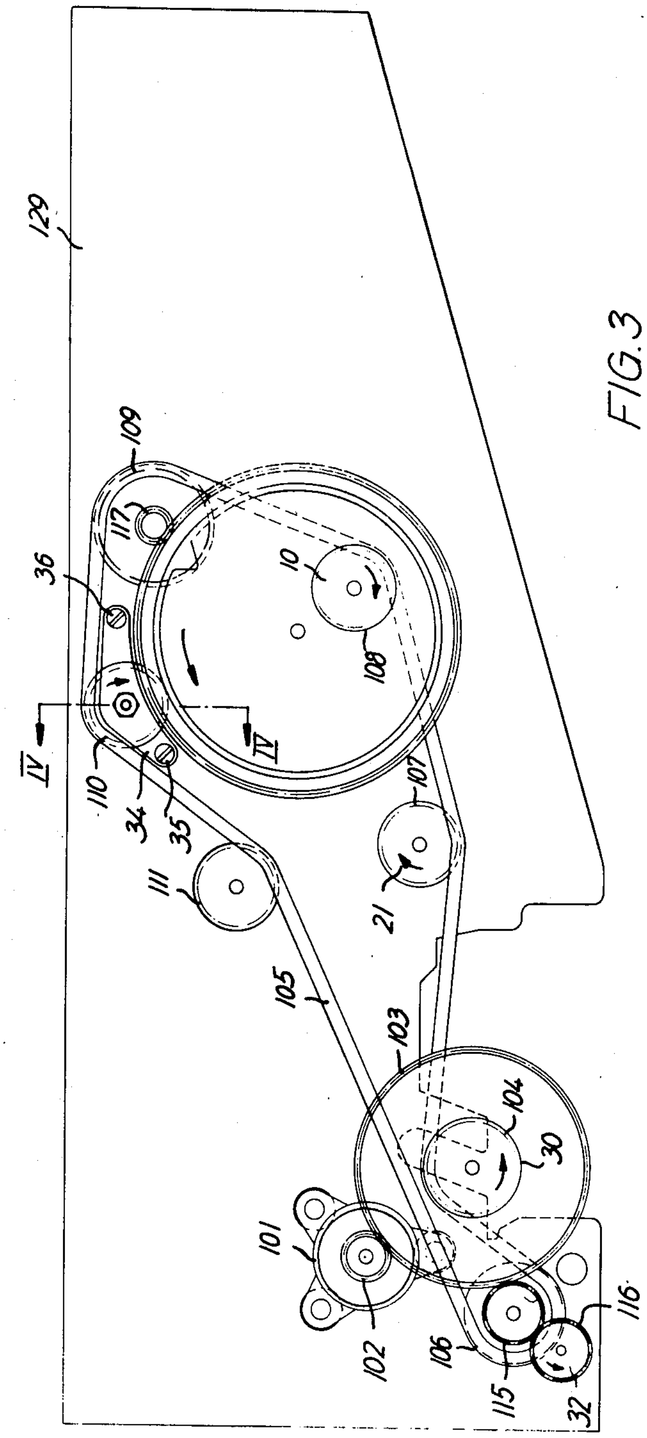
FIG. 3 shows the structure of the drive and transmission means for mechanically movable parts in the copying apparatus.

A copy sheet is taken off from a sheet supply 7 by means of a friction wheel 8 which is provided with pins 9 engaging a set of teeth on a rotating programming disc, shown in FIG. 3, of the kind disclosed in U.S. Pat. No. 3,848,991 to K. G. Zeuthen, whereby the friction wheel 8 is caused at the beginning of a copying cycle to carry out a single complete revolution, as a result of which a copy sheet from sheet supply 7 is conveyed into the space between two co-operating conveying rollers 10 and 11, towards a stop member 12, said conveying rollers being kept apart from each other at that instant.

By means of the programming disc, stop member 12 may be withdrawn from the sheet conveying path and, simultaneously, rollers 10 and 11 are coupled together, whereby the copy sheet is conveyed through a corona device 13 providing the sheet with an electrostatical charge and furtheron past an exposure window 14.

When rotation of the programming disc to turn the friction wheel 8 is started, the movement of table plate 3 is simultaneously initiated, said movement going out from the home position of the table plate shown in FIG. 2 in the direction, for example, to the left.

The programming disc is constructed so as to actuate stop member 12 to be withdrawn from the sheet conveying path when the table plate 3 reaches the extreme position to the left in FIG. 2. In this position of the table plate, an electrical switch, not shown in FIG. 2, will be operated for supplying current to the corona device 13 as well as an exposure lamp 15 extending throughout the width of table plate 3 and illuminating the original positioned thereon in a relatively narrow stripe transverse to the direction of movement of the table by means of a reflector 16.

By means of suitable indications on the table plate 3, the original is positioned thereon so that the end of the original situated to the left in FIG. 2 will pass the light stripe produced by light source 15, 16 during the movement of the table in the direction to the right from the left extreme position simultaneously with the entrance of the leading edge of the copy sheet behind the exposure window 14.

The movement of the table plate 3 from the left to the right takes place synchronously with the movement of the copy sheet after the exposure of window 14 from the right to the left, whereby the copy sheet is exposed line by line to the picture of the original by means of a mirror arrangement 17, 18 and 19 of a construction known per se.

Subsequent to the exposure, the copy sheet is conveyed by a pair of co-operating conveying rollers 20 and 21 onto a developer device 22.

The developer device 22 shown purely schematically is of the construction disclosed in U.S. Pat. No. 3,905,696 to K. G. Zeuthen and comprises a toner trough 23 and a toner bottle 24 connected disengageably therewith, said bottle being designed to be arranged on a supporting shelf not shown in the bottom of the housing 1, the contents of liquid toner in the bottle being supplied by means of a propeller pump 26 driven by a motor 25 to the toner trough 23 through a supply tube 27, whereafter the liquid toner subsequent to circulation through the toner trough is collected in the bottom thereof and returned into the bottle 24 through a connecting stub 28 formed in the bottom of the toner trough and projecting down into an opening in the bottle 23, through which also the drive shaft for propeller pump 26 as well as the supply tube 27 project down into the bottle.

Subsequent to the development, the wet copy sheet is conveyed by a new pair of co-operating conveying rollers 29 and 30 past a drying device in the form of a hot-air blower, shown purely schematically, and furtheron between another pair of co-operating conveying rollers 32 and 33 to outlet slit 6, shown in FIG. 1.

FIG. 3 shows schematically the essential part of the driving members for the movable parts of the apparatus.

The rotary motion of a drive motor 101 which may be coupled directly to a hot-air blower 31, and the actuation of which may be controlled by a start and repeater mechanism of the kind disclosed in co-pending U.S. patent application Ser. No. 622,742, filed in the U.S. Patent Office on Oct. 15, 1975 is transmitted by a gear 102 coupled directly with the motor to a gear 103 which is coupled together with a sprocket wheel 104 and therefrom to a transmission chain 105 engaging a number of sprocket wheels 106 to 111. Sprocket wheels 104, 106, 107 and 108 constitute drive wheels for the conveying rollers 30, 32, 21 and 10, respectively, shown in FIG. 2, roller 32 being driven by sprocket wheel 106 through gears 115 and 116. Sprocket wheel 109 serves through a gear 117 as a drive wheel for the above mentioned rotating programming disc which is designated by 118, and sprocket wheel 110 serves as a drive wheel for transmission members to be described in the following, by which the movement is transferred to the table plate 3, while sprocket wheel 111 serves to straighten the chain 105.

The drive members shown in FIG. 3 are mounted at one longitudinal side of the apparatus, the conveying rollers and the sprocket wheels and gears as well as the programming disc being journalled in bearings mounted in a stationary vertical supporting wall 129 except, however, the sprocket wheel 110 which is journalled in a bearing mounted in a separate supporting frame secured by screws 35 and 36 to wall 129.

Figure 4:
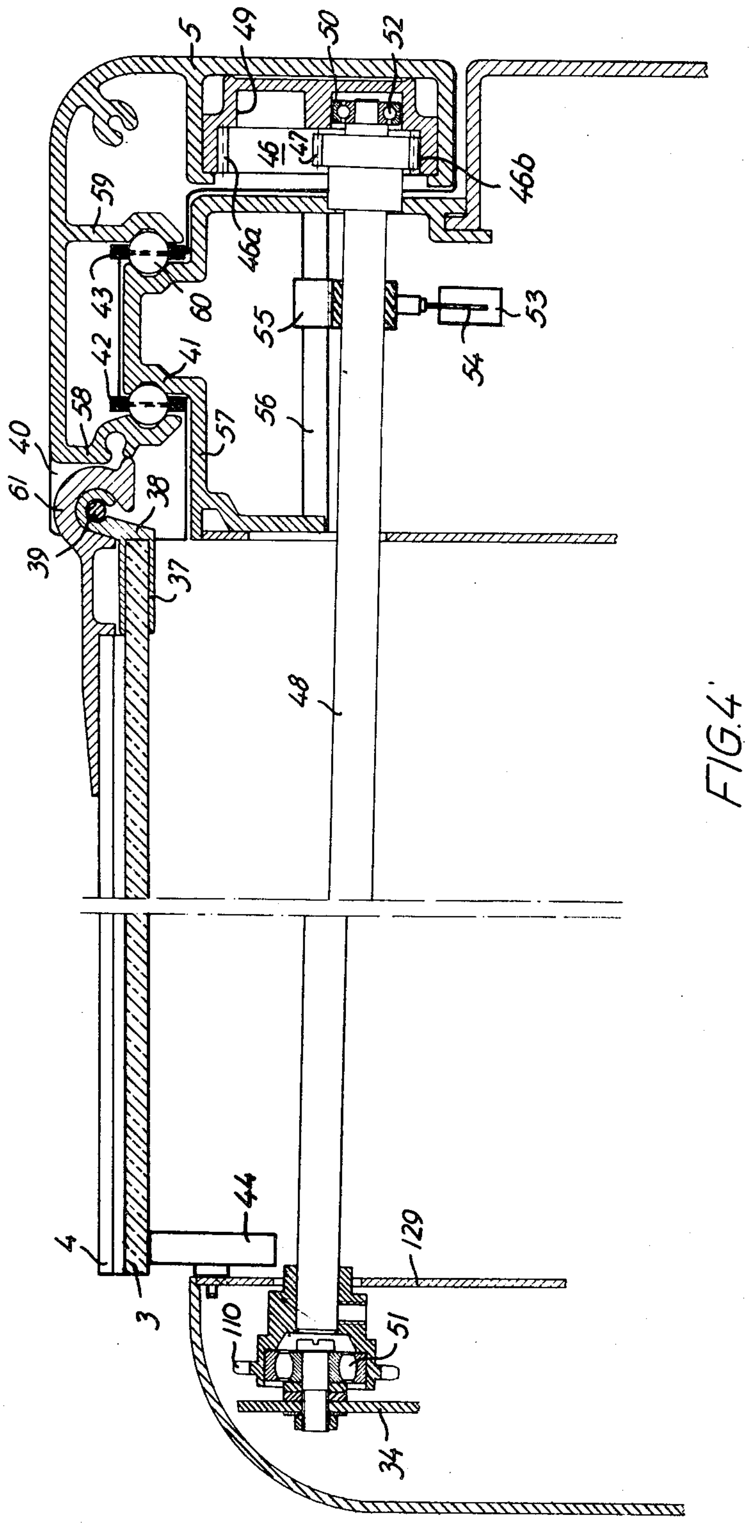
FIG. 4 is a cross-sectional view along the line IV—IV in FIG. 3, to illustrate transmission members between the drive means of FIG. 3 and a movable original support table.

In the cross-sectional view in FIG. 4 of the upper part of the copying apparatus along the line IV—IV in FIG. 3, only one of the driving members of FIG. 3, namely sprocket wheel 110, is shown.

As shown in FIG. 4, table plate 3 is connected along one longitudinal side thereof with a hinge blade 37 which contacts both surfaces of the table plate and has a bent flange portion 38 partly enclosing a hinge shaft 39 extending throughout the length of the table plate, the end of said hinge shaft being secured in a manner not shown in detail in wall members 40 which are secured to the carriage 5 having a substantially L-shaped cross-section, such as shown in FIG. 1.

The movable carriage 5 and the table plate 3 connected therewith by means of wall members 40 and hinge shaft 39 are supported on a single longitudinal rail 41 extending throughout the length of housing 1 on the upper side of a stationary support profile extending below the carriage. The carriage 5 is journalled relative to the rail 41 by means of ball guides 42 and 43.

This entire supporting arrangement for the table plate, the opposite longitudinal side edge of which is supported as shown in FIG. 2 by two wheels 44 and 45 journalled rotatably with a relatively small mutual separation in the above mentioned support wall 129, is disclosed in co-pending U.S. patent application Ser. No. 620,346, filed in the U.S. Patent Office on Oct. 7, 1975 and need, therefore, no further explanation.

Figure 5:
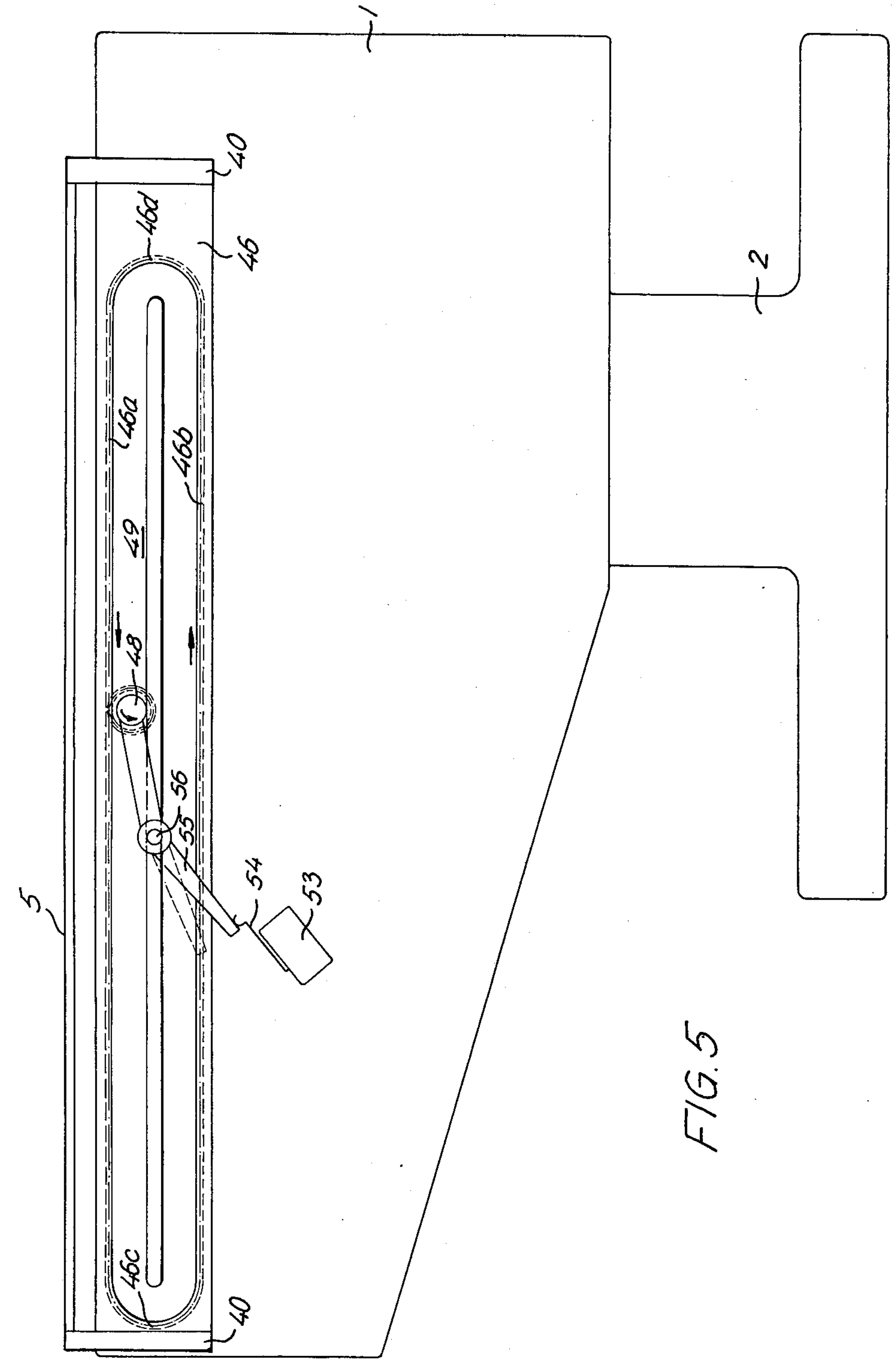
FIG. 5 illustrates schematically the arrangement of a switch actuating member co-operating with the transmission members of FIG. 4.

The transmission members transmitting the movement of the drive members shown in FIG. 3 onto the carriage 5 and the table plate 3 comprise an elongate tooth rim 46 with internal teeth which is mounted in a vertical plane in the depending portion of the L-shaped carriage 5 and comprises two parallel horizontal and rectilinear runs **46*a* and 46*b* interconnected at either end thereof by curved runs 46*c* and 46*d*, such as shown in FIG. 5. Tooth rim 46 is engaged by a pinion 47 which is secured at one end of a drive shaft 48 extending transversely through housing 1 and being connected in the opposite end thereof with sprocket wheel 110, shown in FIG. 3. Inside tooth rim 46, an endless guide track 49 is formed in parallel relationship with the runs of the tooth rim to receive a guide wheel 50 which is mounted rotatably on the end of drive shaft 48 outside pinion 47, so as to guide the pinion to continuously engage the teeth of tooth rim 46.**

The drive shaft 48 which is supported in one end by the guide track 49 formed in tooth rim 46 is supported in the opposite end at the frame structure 34, shown in FIG. 3, by means of a spherical bearing 51 which allows pivotal movement of the drive shaft 48 in a vertical plane.

As will appear from FIG. 5, guide wheel 50 which is mounted rotatably on drive shaft 48 by means of a ball bearing 52 will cause the teeth of tooth rim 46 to be in continuous engagement with pinion 47, the diameter of which is less than the separation between the parallel horizontal runs **46*a* and 46*b* of the tooth rim. When engaging the upper horizontal run 46*a*, the rotation of the pinion 47 following from the movement of the drive member shown in FIG. 3 will result in movement of tooth rim 46 and, thereby, the carriage 5 and the table plate 3 in one direction and, when the pinion engages the other horizontal run 46*b***, the table plate will be moved in the opposite direction.

The change-over of the movement of the table from one to the other direction takes place at the curved runs **46*c* and 46*d* of tooth rim 46 as a result of the continuous engagement between pinion 47 and the teeth of tooth rim 46 caused by guide wheel 50 being bound to follow guide track 49.**

In order to secure that the substantially vertical shifting movement of the end of drive shaft 48 positioned at tooth rim 46 will have the smallest influence possible on the engagement of sprocket wheel 110 with transmission chain 105, the arrangement of said sprocket wheel 110 relative to the spherical bearing 51 is such that the symmetry plane of the sprocket wheel normal to drive shaft 48 includes the pivot centre for drive shaft 48.

According to a particular aspect of the invention, the vertical pivotal movement of drive shaft 48 may be utilized to operate the electrical switch mentioned herein before, by means of which current is supplied to corona device 30 and exposure lamp 15, respectively, subsequent to the start of the copy sheet movement along the conveying path shown in FIG. 2.

In FIG. 5, such a switch is shown in the form of a micro switch 53 having a spring-biased operating arm 54 shown in the figure to assume a position, in which switch 53 is closed to supply current to corona device 13 and exposure lamp 15.

The switch 53 is arranged with such a position of operation arm 54 that the arm will be engageable by an actuating member in the form of a pivot arm 55 which is rotatably mounted, as shown in FIG. 4, on a shaft 56 which is stationary relative to housing 1, one end of the pivot arm being connected with drive shaft 48 near the pinion 47 which engages tooth rim 46. As a result of being spring-biased, the operating arm 54 will be actuated, as shown in FIG. 4, to open the switch 53 when drive shaft 48 is moved downwardly from the position shown, in which pinion 47 engages the upper horizontal run 46*a* of tooth rim 46 which will take place when pinion 47 is passed by the curved run 46*d*, shown to the right in the figure. Conversely, switch 53 will be closed when pinion 47 is passed by the other curved run 46*c* of the tooth rim, as a result of which drive shaft 48 will be shifted outwardly.

A suitable timing of the switch operation may be obtained, if pinion 47 engages in the home position of table plate 3 a portion of one of the horizontal runs of tooth rim 46, in the embodiment shown, the lower run 46*b*, having substantially the same location relative to the curved runs of the tooth rim as the location of drive shaft 48 relative to the opposite end of housing 1, so that the table plate in this position extends throughout its length within the ends of the housing.

When drive motor 101 in FIG. 3 is actuated by operation of a start bottom, the movement of carriage 5 and table plate 3 will take place viewed from the side of the apparatus shown in FIG. 5 and with the directions of rotation and linear movement indicated by arrows in FIGS. 3 and 5, from the home position towards the extreme right position of carriage 5, in which pinion 47 is passed by the curved run 46*c*.

During this first stage of the table movement, a copy sheet will be taken off from the sheet supply 7 by means of the friction wheel 8 influenced by programming disc 118 and carried on towards contact with stop members 12. Since programming disc 118 is constructed as mentioned in the foregoing, so that actuation of stop member 12 to be withdrawn from the copy sheet conveying path and the simultaneous coupling together of roller pair 10 and 11 will take place, when carriage 5 and table plate 3 assume the extreme right position, in which current is supplied to corona device 17 and exposure lamp 15 by the closing of switch 53, the conveying of the copy sheet through corona device 13 towards exposure window 14 will now be initiated. In synchronism therewith, table plate 3 will be moved from the extreme right position in FIG. 5 towards the left, or, as illustrated in FIG. 2, in the direction opposite to the conveying of the copy sheet, whereby the copy sheet will be exposed. When table plate 3 assumes the extreme left position shown in FIG. 5, the exposure has been completed, and the switch 53 will be opened by the shifting movement of pinion 37 from the upper horizontal run 46*a* to the lower horizontal run 46*b* of tooth rim 46, whereby the current supply to corona device 13 and exposure lamp 15 is disconnected.

In the subsequent final stage of the movement of the carriage, the table plate 3 is returned to the home position, and simultaneously the exposed copy sheet is conveyed through developer device 22 and past hot-air blower 31 to be discharged through outlet slit 6 in FIG. 1.

The mechanically very simple, solid and compact construction of the transmission members serving to transmit the movement from the drive motor to the table in a copying apparatus according to the invention results in a considerably smoother change-over of the table movement in each of the extreme positions than in prior art copying machines having a movable table, so that the table is not subjected to strong deceleration and acceleration forces. As already mentioned, an improved reproduction accuracy in the edge regions is also obtained thereby, so that the dimension of the apparatus in the longitudinal direction may be kept on a minimum, dependent on the biggest length of an original desired to be copied.

The copying apparatus specifically described and shown herein represents only one suitable embodiment of the invention. It will readily appear that those parts of the apparatus bearing no direct relationship to the transmission members between the drive motor and the movable carriage may be constructed in a manner different from the disclosed embodiment, in addition to which modifications of the transmission members themselves relative to the embodiment shown will also be possible.

What is claimed is:

1. An electrophotographic copying apparatus comprising a housing, a partially transparent table for supporting an original to be copied and arranged for reciprocating linear movement on the top of said housing out of and back to a home position, an illumination station including a light source arranged in said housing below said table for exposure of a photosensitive copy sheet by said original line by line during said reciprocating movement, a drive motor arranged in said housing, and transmission means for transforming the rotary motion of said motor into said reciprocating movement of the table, said transmission means including a tooth rim connected with said table and having a number of teeth arranged internally along an endless path comprising two parallel rectilinear runs of a length corresponding to the stroke of said table and curved runs interconnecting said linear runs at either end thereof, a drive shaft coupled to said motor, a pinion of a diameter less than the distance between said parallel teeth runs and engaging the teeth of said tooth rim, and being secured on said drive shaft, means for journalling said drive shaft relative to said housing so as to allow vertical shifting of said pinion from one to the other of said rectilinear teeth runs, a guide wheel mounted rotatably on the drive shaft outside said pinion, and an endless guide groove formed inside said tooth rim in parallel relationship with said endless teeth path to form a track for said guide wheel.

2. An electrophotographic copying apparatus as claimed in claim 1, wherein said table is connected along one longitudinal side thereof with a carriage, said tooth rim being mounted on said carriage to extend in a vertical plane, said drive shaft extending transversely through said housing from said carriage to the opposite side of the table, a spherical bearing being mounted on the housing of said opposite side for journalling said drive shaft in a manner to allow pivotal movement thereof in a vertical plane.

3. An electrophotographic copying apparatus as claimed in claim 2, wherein a sprocket wheel is secured on the end of said drive shaft remote from said carriage outside said spherical bearing, said sprocket wheel engaging a drive chain coupled with said motor and being positioned in relation to the spherical bearing so as to include in its symmetry plane normal to the axis of revolution the pivot center for said drive shaft.

4. An electrophotographic copying apparatus as claimed in claim 1, further comprising an electrical switch for supplying current to said light source, and an actuating member for engaging the operating member of said switch to connect and disconnect said current supply in response to the movement of said table, said actuating member being constituted by a pivot arm journalled on a stationary pivot pin and being connected in one end with said drive shaft near said pinion, the other end of said pivot arm being positioned to engage said operating member to actuate the switch by the pivotal movement of the shaft to supply current to said light source only when said pinion engages the teeth of one of said rectilinear runs.

5. An electrophotographic copying apparatus as claimed in claim 4, wherein said pinion engages in the home position of said table the teeth of a portion of one of said rectilinear runs having a location relative to said curved runs corresponding to the location of the transverse drive shaft relative to the ends of the housing, said pivot arm being disengaged from the operating member of said switch in this position of the pinion.

* * * * *